UNITED STATES PATENT OFFICE.

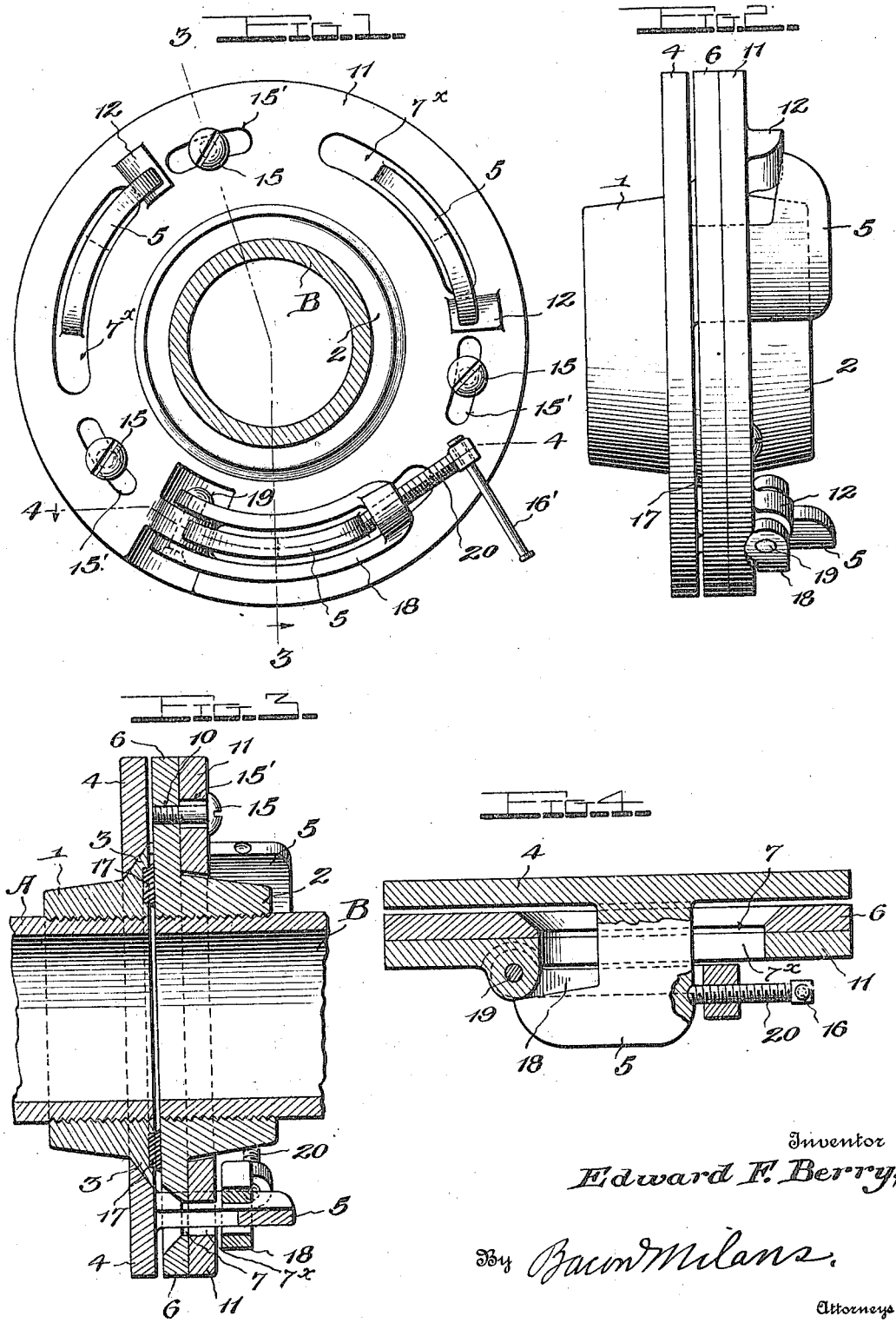

EDWARD F. BERRY, OF NEW ORLEANS, LOUISIANA.

COUPLING.

1,233,170.    Specification of Letters Patent.    Patented July 10, 1917.

Application filed May 9, 1916. Serial No. 96,384.

*To all whom it may concern:*

Be it known that I, EDWARD F. BERRY, citizen of the United States, residing at New Orleans, in the parish of Orleans and State of Louisiana, have invented certain new and useful Improvements in Couplings, of which the following is a specification, reference being had therein to the accompanying drawing.

The invention relates to improvements in couplings, capable of use in unlimited fields, although particularly adapted for coupling pipes of various types.

The object of the invention is to provide a coupling means in which the adjacent members to be coupled may be united and clamped together without the use of fastening screws by suitable clamping parts having relative movements, at the same time providing a device which permits the members to be coupled, to be assembled or disengaged without disturbing their position during the clamping of the coöperating parts.

The invention more specifically embraces a collar having projecting lugs thereon loosely mounted on one pipe member and capable of a free movement therearound as distinguished from a fixed collar which has heretofore been used, so that the lugs of the collar may be inserted through openings in an apertured flange carried by the adjoining pipe section and engage suitable wedges disposed upon a movable clamping ring adjacent said last mentioned pipe section and carried by the apertured flange and adapted to be loosely mounted to permit its wedges to be interposed beneath the wedge portions of the lugs carried by the movable collar to tightly clamp the pipe sections together. During this clamping action the lug carrying flange is free to move independently of its pipe whereby the parts may be assembled or disconnected without disturbing the position of the pipe sections, this being due to the fact that when the wedge members are tightly drawn together the collar and the clamping ring have a relative movement to affect the binding of the parts without changing the position of the pipe sections.

While I have stated the preferred embodiment of my invention, I wish it to be understood that changes can be made in proportions and arrangements of parts, and the coupling can be used wherever a coupling of this character is needed without in any way departing from the invention.

In the drawings, Figure 1 is a front elevation;

Fig. 2 is a side elevation;

Fig. 3 is a sectional view in line 3—3 of Fig. 1; and

Fig. 4 is a detail view.

Referring now more particularly to the drawings wherein like reference characters indicate corresponding parts, 1 and 2 designate opposed coupling members shown as being secured to the adjoining ends of pipe sections A—B and preferably having a threaded connection therewith, although any suitable joint may be employed. The coupling member 1 is substantially circular in formation and has an outwardly extending shoulder 3, the face of which is beveled or inclined. Loosely mounted on the member 1 is a collar 4, carrying wedge lugs 5, three being shown for the purpose of illustration and having a seat along its inner face adapted to conform to the beveled portion 3 of the coupling 1, to provide a joint between the shoulder and collar and at the same time allow the outer faces of these flanges to lie substantially flush with each other. The flange 4 can be shifted or moved around the coupling member 1 at any time without disturbing the position of the coupling member to permit the opposed pipe sections to be coupled or disconnected without revolving or moving the said pipe sections and as the sections are tightened the inclined surfaces of the flange 4 and shoulder 3 are drawn together and thus firmly held, the union being very tight because of this beveled joint.

The coupling member 2 has a flange 6 with a plurality of slots 7 therein concentrically arranged as shown in Fig. 1 to receive the wedge lugs 5 carried by the collar member 4 so that the wedge lugs project through the slots. The lugs have suitable wedge portions near their ends provided with inclined surfaces to engage with the wedges carried by a clamping ring adjacent the flange 6 and of a structure to be later described. The flange 6 is preferably fixed with respect to its coupling member and in addition to having the circumferential slots therein is provided with spaced sockets 10 having threaded walls for receiving suitable clamping screws to provide a means for securing the circumferential ring 11 to the flange. The clamping screws pass through slots in the clamping ring and have relatively broad heads which prevent any longitudinal movement of the clamping ring but allows the same to be rotated. The clamping ring 11 is provided with concentric slots 7× adapted to register with the slots 7 in the flange when the same is in its normal position, whereby the wedge lugs may be inserted through the slots in the clamping ring and flange 6 and project beyond the face of the clamping ring. Adjacent each slot in the clamping ring is a wedge lug 12 having a relatively broad outer beveled surface to coöperate with the beveled surfaces of the wedge lugs 5 carried by the movable collar member when the clamping ring is shifted to draw the opposed members together and effect a clamping of the pipe sections. To prevent any movement of the clamping ring save in a rotary direction the fastening bolts 15 have relatively broad heads contacting with the face of the ring preventing any longitudinal movement of the ring. They pass through the spaced slots 15' in the clamping ring adjacent each of the lug receiving slots, and preferably have a threaded connection with the sockets 10 in the apertured flange. A suitable packing 17 is disposed around the coupling member 1 and engages the face of the flange member 4 when the opposed members are clamped together to prevent any leakage between the joints.

In order to secure a positive turning movement of the clamping ring 11, a suitable bail 18 is attached to one of the lugs on the clamping ring by a pivot pin 19, the arms of the bail being circumferentially curved to follow the contour of the slots in the clamping ring and receive therebetween the head of one of the wedge lugs carried by the collar or flange. The end of each bail is closed and has a threaded socket receiving an adjustable member 20 provided with a head having an aperture therein receiving the slidable turning pin 16' to permit the screw to be adjusted, as it has been found that these adjustable screws often lie so close to the flange as to prevent the use of a wrench, and by sliding the turning pins back and forth each screw can be readily tightened. The screw lies behind its wedge lug when the lug has been passed through the apertured flange and the clamping ring so as to tightly clamp the opposed sections together upon the adjustment of the clamping screw, it being apparent that upon the adjustment of this screw one set of the wedge members is forced in a direction opposite to the direction of the other set. By forcing the clamping ring in a direction reverse of the direction which the wedge lug of the collar faces the coöperating members are tightly drawn together so that the opposed members to be coupled are firmly held and all leakage between these parts prevented. While I have illustrated this specific form of adjusting means which has been found to be efficient, any suitable clamping devices may be used if desirable. The clamping screws carried by the bail 18 enter a suitable socket within the edge of each wedge lug so that during the clamping of the coöperating wedge members, it is impossible to disengage the bail therefrom. When it is desired to uncouple the parts it is merely necessary to raise the bail to a vertical position and slightly tap the nose of one of the wedge members with a hammer or like instrument, so that these wedge parts will become immediately disengaged. While it has been preferable to use a clamping ring such as designated by the numeral 11 which is capable of a rotary movement around the supporting flange, it has been found that good results can be obtained by merely mounting lugs upon the flange 6 and only moving one of the coöperating wedge parts, which in a structure of this character would be the wedge members carried by the collar 4 which is loosely associated with the part that carries the same. This type of joint is particularly adapted for a ground coupling where no packing is used and it will therefore be understood that a structure of this character is clearly within the scope of my invention and may be used whenever this type of device is found to be desirable.

From the foregoing it will be seen that when it is desired to couple the opposed members whether they be pipe sections or a cap or closure of some sort or other parts to be clamped together in an expeditious manner and in sealed or other relation the loose collar 4 carried by the coupling part 1 is revolved so as to bring the wedge lugs carried thereby into alinement with the openings 7 in the apertured flange supported by the opposite member and the openings 7× in the clamping ring mounted for circumferential movement on said flange. After this preliminary adjustment and after the lug has been inserted through the registering openings in the flange and clamping ring the bail 18 is swung over one of the wedge lugs and the adjusting device carried thereby is moved by the handle therein so as to rotate the clamping ring and its wedges on the loose ring or both in a direction opposite to the movement of the wedge lugs carried by the collar 4 to tightly draw together the opposed pipe sections, at the same time holding the collar 4 into close contact with the coupling member 1. It will therefore be seen that the opposed pipe sections can be coupled without in any way disturbing the position of these associated parts to be coupled due to the fact that the collar 4 is loosely mounted upon its coupling part and can be freely turned so that the opposed wedge members carried by the coöperating coupling parts may be tightly clamped together at any time without affecting the position of the parts to be coupled. When the collar 4 is in a clamped position, there is a slight wedging between the beveled wall of the shoulder 3 and the conical seat in the collar so that this collar is firmly held, but is also mounted in such a manner that when it is desired to disengage the wedge part it will move freely around the coupling part 1 when one of the wedge lugs carried thereby is slightly tapped by any suitable instrument to disengage the same from its coöperating wedge.

While I have illustrated and described the preferred embodiment of my invention, it is of course apparent that many changes and modifications may be made without departing from the spirit thereof and that the coupling is capable of use in various fields.

Having thus described my invention what I claim is:

1. A coupling of the character described, comprising a pair of opposing members, wedging parts carried by one of said members, and bearing portions carried by the other of said members adapted to be engaged by said wedge parts upon relative rotary movement, and means at separated points for securing said bearing portions to the member carrying the same.

2. A coupling of the character described, comprising a pair of opposing members, wedging parts carried by one of said members, and bearing portions carried by the other of said members adapted to be engaged by said wedge parts upon relative rotary movement, and means at separated points for securing said bearing portions to the member carrying the same, said means comprising screw and slot engagements, substantially as described.

3. A coupling of the character described, comprising opposing members, wedge parts projecting from the face of one of said members, and parts formed with suitable bearings for said wedge parts disposed over the face of the other of said members and adjustably fastened to said face.

4. A coupling member of the character described, provided with a separable wedging part thereon, and means passing through said wedging part and engaging said member for securing them in operative relation, in combination with another member carrying a wedge part adapted to coöperate with said first mentioned wedge part.

5. A coupling member of the character described, provided with a separable wedging part thereon, and means passing through said wedging part and engaging said member for securing them in operative relation, in combination with another member carrying a wedge part adapted to coöperate with said first mentioned wedge part, said securing means comprising a threaded bolt passing through the wedge part and having threaded engagement with the coupling member adjacent to the same.

In testimony whereof I hereunto affix my signature in the presence of two witnesses.

EDWARD F. BERRY.

Witnesses:
CALVIN T. MILANS,
CHARLES THOMAS.

Copies of this patent may be obtained for five cents each, by addressing the "Commissioner of Patents, Washington, D. C."